United States Patent [19]

Weisweiler

[11] Patent Number: 4,847,054
[45] Date of Patent: Jul. 11, 1989

[54] PROCESS FOR CATALYTICALLY REDUCING NO CONTAINED IN A GAS

[75] Inventor: Werner Weisweiler, Remchingen-Singen, Fed. Rep. of Germany

[73] Assignee: Metallgesellschaft AG, Frankfurt am Main, Fed. Rep. of Germany

[21] Appl. No.: 128,018

[22] Filed: Dec. 3, 1987

[30] Foreign Application Priority Data

Dec. 6, 1986 [DE]  Fed. Rep. of Germany ....... 3641773

[51] Int. Cl.$^4$ .................. B01D 53/36; B01J 38/68; B01J 37/02; B01J 23/90
[52] U.S. Cl. .................. 423/239; 423/215.5; 502/21; 502/24; 502/25; 502/27; 502/41
[58] Field of Search .................. 423/239 A, 215.5; 502/21, 24, 25, 27, 38, 41, 517

[56] References Cited

U.S. PATENT DOCUMENTS

| | | | |
|---|---|---|---|
| 4,003,711 | 1/1977 | Hishinuma et al. | 423/239 A |
| 4,043,939 | 8/1977 | Kasaoka | 502/38 |
| 4,044,102 | 8/1977 | Moraki et al. | 502/56 |
| 4,080,426 | 3/1978 | Kittrell et al. | 423/239 R |
| 4,089,930 | 5/1978 | Kittrell et al. | 423/239 A |
| 4,141,959 | 2/1979 | Kato et al. | 423/239 A |
| 4,142,989 | 3/1979 | Kohama et al. | 502/21 |
| 4,188,365 | 2/1980 | Yoshioka et al. | 423/239 A |

FOREIGN PATENT DOCUMENTS

| | | | |
|---|---|---|---|
| 103330 | 2/1977 | Japan | 502/38 |
| 263934 | 2/1977 | Japan | 502/38 |
| 42490 | 4/1977 | Japan | 423/239 A |
| 34743 | 2/1985 | Japan | 502/27 |
| 38037 | 2/1985 | Japan | 502/56 |
| 1548806 | 7/1979 | United Kingdom . | |

OTHER PUBLICATIONS

*Katalysatoren, Tenside und Mineralol Additive*–p. 33, by–J. Falbe & V. Kasserodt–Georg Thieme Verlag, Stuttgart, 1978.

*Primary Examiner*—Paul E. Konopka
*Attorney, Agent, or Firm*—Sprung Horn Kramer & Woods

[57] ABSTRACT

A process of catalytically reducing NO contained in a gas which contains $SO_2$. The NO is reduced with $NH_3$, which is admixed to the gas which contains $SO_2$ and NO. The mixture is supplied to the catalyst at a rate of 0.2 to 20 standard liters per minute and per gram of catalyst and is reacted with the latter in a fluidized bed at a temperature between 185° and 500° C. and under normal pressure. The catalyst has a particle size between 0.1 and 3 mm and is composed of an acid support and an active component, which consists of $V_2O_5$, $MnO_2$, CuO, $Fe_2O_3$, NiO and/or $Y_2O_3$ and has been applied to the support in a quantity of 0.5 to 20% by weight. It is proposed that part of the catalyst is removed from the fluidized bed and is regenerated and returned to the fluidized bed.

4 Claims, 1 Drawing Sheet

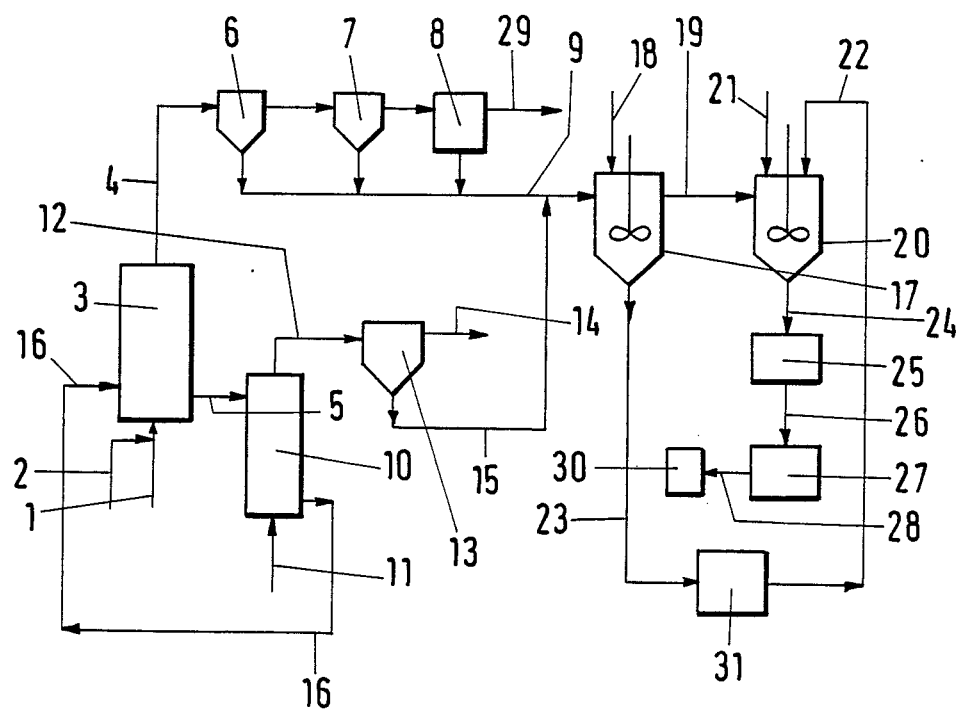

PROCESS FOR CATALYTICALLY REDUCING NO CONTAINED IN A GAS

BACKGROUND OF THE INVENTION

This invention relates to a process of catalytically reducing NO which is contained in an $SO_2$-containing gas by a treatment with $NH_3$ as a reducing agent, wherein the gas that contains $SO_2$ and NO is mixed with $NH_3$, the mixture is fed to the catalyst at a rate of 0.2 to 20 standard liters per minute and per gram of catalyst and is reacted there in a fluidized bed under normal pressure at a temperature between 185° and 500° C., and the catalyst has a particle size between 0.1 and 3 mm and is composed of an acid support and an active component, which consists of $V_2O_5$, $MnO_2$, CuO, $Fe_2O_3$, NiO and/or $Y_2O_3$ and has been applied to the support in a quantity of 0.5 to 20% by weight.

Such process has already been proposed in German Patent Application P No. 36 33 493.6, but it has been found that in that process part of the $SO_2$ contained in the gas reacts with the catalyst during the NO-reducing reaction. For this reason it is an object of the invention so to improve the previously proposed process that the activity of the catalyst is maintained on a high level for a long time.

SUMMARY OF THE INVENTION

The object underlying the invention is accomplished in that part of the catalyst is removed from the fluidized bed and is regenerated and returned to the fluidized bed. Within the scope of the invention it is contemplated that 1 to 33% by weight of the catalyst contained in the fluidized bed is regenerated per day. It is also contemplated within the scope of the invention that the catalyst is continuously removed from the fluidized bed and is regenerated by being heated to between 600° and 900° C. for 0.5 to 5 minutes. It has been found that it is particularly desirable to heat the catalyst to be regenerated in a fluidized bed, in which air is used as a fluidizing gas. Alternatively, it is contemplated within the scope of the invention that the catalyst that has been removed from the fluidized bed is cooled and for its regeneration is treated at 20° to 70° C. for 1 to 10 minutes with an aqueous solution which contains nitrates and/or sulfates of the elements V, Mn, Cu, Fe, Ni and/or Y, and the catalyst which has been treated with the solution is dried at 150° C. for one to two hours and is subsequently heated at 550° to 900° C. for 1 to 2 hours. In a further development of the invention, the gas which contains $SO_2$ and NO is mixed with $NH_3$ in a molar ratio of $NO:NH_3=1:0.7$ to 1:1.3. Finally, it is contemplated within the scope of the invention that the catalyst dust formed by mechanical abrasion and the dust that is contained in the gas are jointly separated and collected and are leached with sulfuric acid or nitric acid having a pH value between 1 and 2 and the resulting acid solution which contains metal salt is used to produce new catalyst or for a wet regeneration of spent catalyst.

The process in accordance with the invention can be used to special advantage for the removal of nitrogen oxides from $SO_2$-containing exhaust gases which have been formed by a combustion of carbonaceous fuels, particularly natural gas, petroleum and coal. It has been found that the active components of the NO-reducing catalyst more or less strongly react with the $SO_2$ that is contained in the exhaust gas and that said reactions result particularly in a formation of the sulfates and sulfites of manganese, copper and iron. For a regeneration of the NO-reducing catalyst said compounds must be reconverted to oxides. Within the scope of the invention this can be accomplished by a dry or wet process. A dry regeneration in a fluidized bed will desirably result in an $SO_2$-containing gas, which may be processed, e.g., in a manner known per se to produce sulfuric acid. A regeneration by a wet process will afford the advantage that fresh catalyst is continuously supplied to the NO-reducing reaction so that the rate at which NO is reduced will be increased. The step performed within the scope of the invention and residing in that the abraded catalyst fines which are formed in the fluidized bed and contain heavy metals are re-used to produce catalyst or to regenerate catalyst will prevent a formation of polluting process residues, particularly because the catalyst contained in the fluidized bed used for the reduction of NO has an extremely long life and need not be replaced and deposited on a dump for hazardous waste. Besides, it is of special importance that in the process in accordance with the invention the quantity of catalyst contained in the fluidized bed used for the reduction of NO can be changed within certain limits so that the rate at which NO is reduced can be adapted to the fluctuating NO contents of the gas.

BRIEF DESCRIPTION OF THE DRAWING

The process in accordance with the invention will now be explained in more detail with reference to the flow scheme of the Figure in which the process is illustrated.

DETAILED DESCRIPTION OF THE INVENTION

The exhaust gas which has been produced in a combustion plant and from which substantially all dust has been removed is at a temperature between 250° and 280° C. as it enters the fluidized bed reactor 3. $NH_3$ from line 2 is admixed to the exhaust gas 1 at a molar ratio of $NO:NH_3=1:1$. The fluidized bed reactor 3 contains the catalyst, which consists of a support and an active component and has a particle size between 0.1 and 0.5 mm. The catalyst support consists of an aluminum silicate. The active component consists of manganese oxide and copper oxide in a molar ratio of 1:1. In the fluidized bed reactor 3 the NO contained in the exhaust gas reacts with the added $NH_3$ with preferential formation of nitrogen and water vapor. After the reduction of NO, the exhaust gas is conducted from the fluidized bed reactor 3 via line 4 to the series-connected cyclones 6 and 7, in which the catalyst dust formed by mechanical abrasion and any dust particles which have remained in the gas are almost entirely separated. From the cyclone 7 the exhaust gas enters the electrostatic precipitator 8, in which the remaining dust particles are collected. The dustfree exhaust gas is then discharged via line 29.

5 to 10% of the catalyst contained in the fluidized bed reactor 3 is withdrawn per day from the lower portion of the fluidized bed reactor 3 and is supplied via line 5 to the much smaller fluidized bed reactor 10, which via line 11 is supplied with air that is at a temperature of 800° C. and serves as a fluidizing gas. During a residence time of about 4 minutes, the catalyst particles supplied to the fluidized bed reactor 10 release the $SO_2$ which they have taken up. The $SO_2$-containing fluidizing gas leaves the fluidized bed reactor via line 12 and is the supplied to the cyclone 13 for dust collection. The dust collected in the cyclone 13 consists almost entirely of abraded fines of catalyst and is fed via line 15 to line 9. After the collection of dust, the $SO_2$-containing fluidizing gas is withdrawn via line 14 and is cooled in a manner known per se with a recovery of heat and is then processed further. From the fluidized bed reactor 10 the regenerated catalyst is recycled via line 16 to the fluidized bed reactor 3.

The abraded catalyst fines are delivered from line 9 to a stirred container 17 and are leached therein with aqueous nitric acid at a pH value between 1 and 2. The aqueous nitric acid is supplied to the stirred container 17 via line 18. The leached catalyst dust, which is free of metal, is withdrawn from the stirred container 17 via line 23 and is used as a raw material for making new catalyst pellets. The metal salt-containing acid solution is supplied from the stirred container 17 via line 19 to the stirred container 20, in which new catalyst is formed by an impregnation of support particles. Via line 21, the stirred container 20 is fed with an aqueous solution which contains copper nitrate and manganese nitrate. The particles of the catalyst carrier are supplied via line 22 to the stirred container 20. The wet catalyst particles are supplied via line 24 to the dryer 25, which consists of a fluidized bed dryer and in which they are dried at about 150° C. The dried catalyst particles are subsequently fed via line 26 to the furnace 27, in which they are heated at a temperature of about 600° C. so that the nitrates of copper and manganese are decomposed to form the corresponding oxides. The new catalyst which has thus been produced is delivered via line 28 to the storage bin 30 and can be supplied from the latter to the fluidized bed reactor 3 as is required. The metal-free catalyst dust is supplied to the pelletizing apparatus 31, in which catalyst support pellets are formed, which are then supplied via line 22 to the stirred container 20.

I claim:

1. A process for catalytically reducing NO which is contained in an $SO_2$-containing gas by a treatment with $NH_3$ as a reducing agent, comprising: mixing gas that contains $SO_2$ and NO with $NH_3$, feeding the gaseous mixture to a reduction zone containing a fluidized bed of a catalyst, at a rate of 0.2 to 20 standard liters per minute and per gram of catalyst, reacting the gaseous mixture in the bed under normal pressure at a temperature between 185° and 500° C., the catalyst having a particle size between 0.1 and 3 mm and is composed of an acid support and an active component which consists of at least one of the components of the group composed of $V_2O_5$, CuO, $Fe_2O_3$, NiO and $Y_2O_3$, the active component being applied to the support in a quantity of 0.5 to 20% by weight, withdrawing a treated gaseous mixture from the reduction zone and separating abraded catalyst fines from said treated gaseous mixture, removing part of the catalyst from the reduction zone and feeding it into a regeneration zone, heating the catalyst in the regeneration zone in a fluidized bed of catalyst to 600° to 900° C., feeding hot air as a fluidizing gas into the regeneration zone, withdrawing regenerated catalyst from the regeneration zone and recycling it into the reduction zone, withdrawing catalyst dust containing exhaust gas from the regeneration zone and separating said catalyst dust from the exhaust gas, leaching said catalyst dust in a leaching zone with acid and withdrawing a metal salt-containing acid solution, mixing said solution with particles of the catalyst support and impregnating said particles, drying and heating the impregnated particles to produce a catalyst for reducing NO in said reduction zone.

2. A process according to claim 1, further comprising feeding the abraded catalyst fines into the leaching zone.

3. A process according to claim 1, further comprising mixing an aqueous solution which contains nitrates and/or sulfates of at least one of the elements V, Mn, Cu, Fe, Ni and Y with the metal salt-containing acid solution and the particles of the catalyst support.

4. A process according to claim 1, wherein the impregnated particles are heated at 550° to 900° C. for 1 to 2 hours.

* * * * *

UNITED STATES PATENT AND TRADEMARK OFFICE
CERTIFICATE OF CORRECTION

PATENT NO. : 4,847,054

DATED : July 11, 1989

INVENTOR(S) : Werner Weisweiler

It is certified that error appears in the above-identified patent and that said Letters Patent is hereby corrected as shown below:

Title Page      U.S. PATENT DOCUMENTS: After " 4,044,102, 8/1977" delete " Moraki " and substitute -- Muraki --, after " 4,142,989, 3/1979 " delete "Kohama " and substitute -- Kohana --/ FOREIGN PATENT DOCUMENTS: Delete " 263934 " and substitute -- 26393 --

Col. 4, line 9      After " $V_2O_5$, " add -- $MnO_2$, --

Signed and Sealed this

Eighteenth Day of December, 1990

*Attest:*

HARRY F. MANBECK, JR.

*Attesting Officer*      *Commissioner of Patents and Trademarks*